No. 707,448. Patented Aug. 19, 1902.
W. O'NEILL & W. H. GORDON.
WATER DISTRIBUTION.
(Application filed June 24, 1901.)
(No Model.) 2 Sheets—Sheet 1.
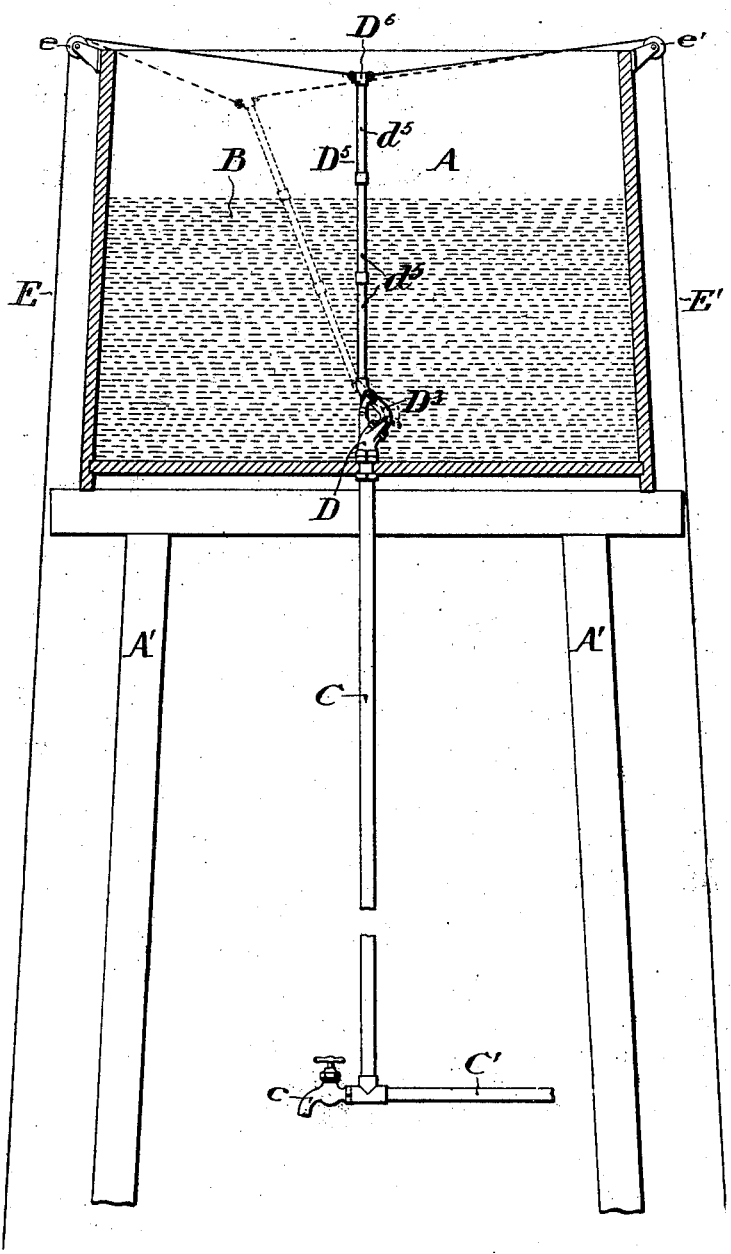
WITNESSES:
INVENTORS:
WESLEY O'NEILL,
WILLIAM H. GORDON

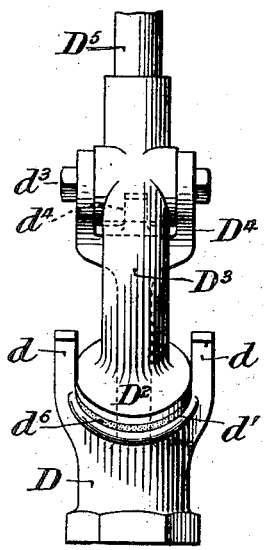
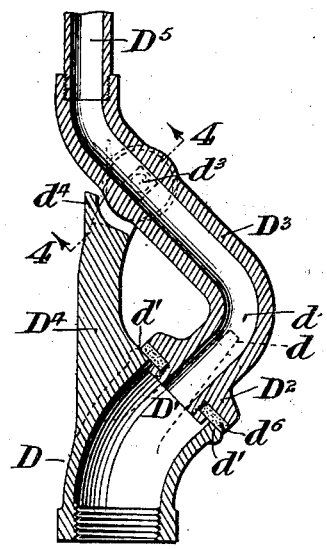
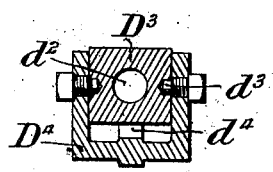

UNITED STATES PATENT OFFICE.

WESLEY O'NEILL AND WILLIAM H. GORDON, OF RUSSELLVILLE, PENNSYLVANIA.

WATER DISTRIBUTION.

SPECIFICATION forming part of Letters Patent No. 707,448, dated August 19, 1902.

Application filed June 24, 1901. Serial No. 65,734. (No model.)

*To all whom it may concern:*

Be it known that we, WESLEY O'NEILL and WILLIAM H. GORDON, of Russellville, in the county of Chester and State of Pennsylvania, have invented certain new and useful Improvements in Water Distribution, whereof the following is a specification, reference being had to the accompanying drawings.

Our invention relates to isolated systems of water distribution such as are used in rural communities and which consist of an elevated tank adjacent to a well or stream, a pump operated by a windmill or other intermittent source of power, and suitable piping connections, including a main supply-pipe extending from the pump to the tank, in communication with the tap-outlets. The tanks aforesaid are usually exposed upon skeleton towers, and whether inclosed or not the supply-pipes leading to and from them are liable to be ruptured by water freezing therein while the pump is in operation and the water is at rest within said pipes.

It is the particular object of our invention to provide a valve for the supply-pipe of a tank of the class specified so constructed and arranged as to establish free communication between said pipe and the water in the tank while the apparatus is in operation and while the apparatus is out of operation to exclude the water in the tank from said pipe and place the latter in communication with the atmosphere, so that all of the water may be withdrawn from said pipe to eliminate the possibility of rupturing the same by the freezing of water therein.

Our invention consists of the novel features of construction and arrangement hereinafter specified and claimed.

In the accompanying drawings, Figure 1 shows a convenient embodiment of our improvements. Fig. 2 is a front elevation of the valve shown in Fig. 1. Fig. 3 is a vertical sectional view of said valve. Fig. 4 is a sectional view of said valve, taken on the line 4 4 in Fig. 3.

Referring to said figures, A is the reservoir-tank, conveniently elevated upon the skeleton tower A' and adapted to contain a supply of water B. The water B is delivered to and distributed from said tank through the main supply-pipe C, which is vertically disposed within said tower in communication with the pump through the pipe C' and also in communication with the outlet-taps, as indicated at $c$. The valve-casing D is directly connected with said supply-pipe C within the tank A, and the main port D' of said casing opens into the water-space in said tank. Said port D' comprises the seat $d'$ for the valve-head $D^2$, which latter is provided with the gasket $d^6$ for contact with said seat. Said valve-head $D^2$ is conveniently formed in integral relation with the lever $D^3$, which is fulcrumed at $d^3$ in the bracket-arm $D^4$, which projects from the casing D in fixed relation therewith. In order to limit the movement of the valve-head $D^2$, we provide the bracket-arm $D^4$ with the abutment $d^4$, arranged to contact with the lever $D^3$, and to insure the proper registry of the head $D^2$ with the seat $d'$ we provide the casing D with lateral guide-lugs $d$. Said valve-head $D^2$ is provided with the vent-port $d^2$, which extends through the lever $D^3$ in communication with the pipe $D^5$, which latter is open to the atmosphere above the normal water-level in the tank A. Said pipe $D^5$ is conveniently formed of sections $d^5$, as indicated in Fig. 1, so as to be adjustable to various heights with respect to the tank A. The top of said pipe $D^5$ is conveniently provided with the yoke $D^6$, to the opposite sides of which are attached the flexible connectors E E', which extend over the sheaves $e$ $e'$ to any position conveniently accessible to the operator.

During the normal operation of the device above described the valve-head $D^2$ is uplifted from its seat, as indicated in dotted lines in Fig. 1, and retained by the connector E, so that the water may be continuously delivered to or from the tank A through the pipe C. When, however, the device is out of operation, the water within the pipe C would of course be at rest and liable to freeze and burst said pipe C. Therefore when the use of the apparatus is to be discontinued over night or at any other time the operator releases the connector E and shifts the pipe $D^5$ by the connector E' to the position shown in full lines in Fig. 1. The valve-head $D^2$ closes the main port D', and the water B in the tank A is excluded from said pipe C. Thereupon, the pipe C being placed in communication with the atmosphere through the pipe $D^5$, the tap $c$ may be opened and all of the pipes drained of the water normally contained therein. When it is desired to resume the normal operation of the apparatus, the connector $E'$ is released and the pipe $D^5$ drawn to the position indicated in dotted lines in Fig. 1 by means of the connector E, thereby opening the valve-port $D'$, whereupon the water B flows within the pipe C in communication with the tap $c$ and the pipe $C'$ is placed in communication with the tank. It is to be noted that if the operation of the pump is accidentally resumed while the valve is in the closed position (shown in full lines in Fig. 1) the water delivered through the pipe C is vented at the top of the pipe $D^5$ and falls within the tank A.

We do not desire to limit ourselves to the precise details of construction and arrangement hereinbefore described, as it is obvious that various modifications may be made therein without departing from the essential features of our invention.

We claim—

1. The combination with the tank A; of the water-supply pipe C; the valve-casing D, fixed in communication with said supply-pipe, and provided with the main port $D'$; the lever fulcrumed on said casing; the valve-head $D^2$, upon said lever arranged to register with said port $D'$; the vent-port $d^2$, in said lever; the pipe $D^5$, connecting said port $d^2$, with the atmosphere; and the flexible connectors E, $E'$, operatively attached to said pipe $D^5$, upon the opposite sides thereof, substantially as set forth.

2. In a valve, the combination with a casing provided with a main port; of a bracket-arm projecting from said casing; a lever fulcrumed in said bracket-arm; a valve-head upon said lever arranged to register with said main port; a vent-port extending through said valve-head and lever, in communication with the atmosphere; and flexible connectors attached to the opposite sides of said vent-pipe, substantially as set forth.

3. In a valve, the combination with a casing provided with a main port; of a bracket-arm projecting from said casing; a lever fulcrumed in said bracket-arm; a valve-head upon said lever arranged to register with said main port; a vent-port extending through said valve-head and lever, in communication with the atmosphere; and an abutment fixed upon said casing to limit the motion of said valve-head with respect to said main port, substantially as set forth.

4. In a valve, the combination with a casing provided with a main port; of a bracket-arm projecting from said casing; a lever fulcrumed in said bracket-arm; a valve-head upon said lever arranged to register with said main port; a vent-port extending through said valve-head and lever, in communication with the atmosphere; an abutment fixed upon the bracket-arm of said casing, arranged to limit the motion of said valve-head with respect to said main port; and guides upon said valve-casing for said valve-head, substantially as set forth.

In testimony whereof we have hereunto signed our names, at Russellville, Pennsylvania, this 13th day of June, 1901.

WESLEY O'NEILL.
WILLIAM H. GORDON.

Witnesses:
E. L. HARLAN,
HOWARD HARLAN, Jr.